(12) United States Patent
Madhireddy

(10) Patent No.: US 11,300,934 B2
(45) Date of Patent: Apr. 12, 2022

(54) DYNAMIC SETTINGS FOR GENSET AUTOMATIC LOAD-DEPENDENT START-STOP CONTROL

(71) Applicant: Schlumberger Technology Corporation, Sugar Land, TX (US)

(72) Inventor: Ramakrishna Madhireddy, Cypress, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 163 days.

(21) Appl. No.: 16/866,905

(22) Filed: May 5, 2020

(65) Prior Publication Data

US 2020/0371484 A1 Nov. 26, 2020

Related U.S. Application Data

(60) Provisional application No. 62/851,863, filed on May 23, 2019.

(51) Int. Cl.
| | | |
|---|---|---|
| *H02J 1/00* | (2006.01) | |
| *H02J 3/00* | (2006.01) | |
| *G05B 19/02* | (2006.01) | |
| *H02J 3/40* | (2006.01) | |
| *H02J 3/46* | (2006.01) | |

(52) U.S. Cl.
CPC ............ *G05B 19/02* (2013.01); *H02J 3/40* (2013.01); *H02J 3/466* (2020.01); *G05B 2219/2639* (2013.01)

(58) Field of Classification Search
CPC ............ G05B 19/02; G05B 2219/2639; G05B 15/02; H02J 3/40; H02J 3/466
USPC .......................................................... 307/85
See application file for complete search history.

(56) References Cited

U.S. PATENT DOCUMENTS

| | | | |
|---|---|---|---|
| 6,639,331 | B2 | 10/2003 | Schultz |
| 8,519,565 | B2 | 8/2013 | Dozier et al. |
| 8,604,639 | B2 | 12/2013 | Hopwood |
| 9,240,687 | B2 | 1/2016 | Carralero et al. |
| 9,644,431 | B2 | 5/2017 | Myers et al. |

(Continued)

FOREIGN PATENT DOCUMENTS

| | | |
|---|---|---|
| EP | 2682339 A1 | 1/2014 |
| WO | 2018201118 A1 | 11/2018 |

(Continued)

*Primary Examiner* — Richard Tan
(74) *Attorney, Agent, or Firm* — Jeffrey D. Frantz

(57) ABSTRACT

Methods and apparatus for automatic, dynamically adjusted operation of load-sharing gensets. An example of such operation may include determining an updated genset-removal load based on a genset-addition load, an initial genset-removal load, a human-selected one of predetermined levels of dynamism, and the number of operating ones of the gensets. An operating genset is halted in response to the actual loads of each operating genset simultaneously being at or below the updated genset-removal load. In another example, while two or more gensets are operating, an updated genset-removal load is determined based on the genset-addition load and a hysteresis setpoint, and an operating genset is halted in response to actual loads of each operating genset simultaneously being at or below the updated genset-removal load.

20 Claims, 4 Drawing Sheets

(56) References Cited

U.S. PATENT DOCUMENTS

| | | |
|---|---|---|
| 9,803,461 B2 | 10/2017 | Boone |
| 9,806,530 B2 | 10/2017 | Martinez |
| 10,017,993 B2 | 7/2018 | Hu et al. |
| 10,151,178 B2 | 12/2018 | Stephenson et al. |
| 10,243,371 B2 | 3/2019 | Gerdes et al. |
| 10,309,166 B2 | 6/2019 | Thiemann et al. |
| 10,390,466 B2 | 8/2019 | Held et al. |
| 10,472,953 B2 | 11/2019 | Orban |
| 10,491,004 B2 | 11/2019 | Gerdes et al. |
| 10,597,996 B2 | 3/2020 | Boone |
| 10,649,427 B2 | 5/2020 | Krippner et al. |
| 10,655,292 B2 | 5/2020 | Orban |
| 10,662,709 B2 | 5/2020 | Orban |
| 10,697,275 B2 | 6/2020 | Krippner et al. |
| 10,699,822 B2 | 6/2020 | Orban et al. |
| 10,724,341 B2 | 7/2020 | Krippner et al. |
| 10,731,426 B2 | 8/2020 | Brandsvoll et al. |
| 10,745,975 B2 | 8/2020 | Orban et al. |
| 10,760,348 B2 | 9/2020 | Krippner et al. |
| 2010/0094490 A1 | 4/2010 | Alston et al. |
| 2014/0062199 A1 | 3/2014 | Martinez |
| 2014/0265354 A1 | 9/2014 | Folken et al. |
| 2019/0115758 A1 | 4/2019 | Orban et al. |
| 2019/0128107 A1 | 5/2019 | Janakiraman et al. |
| 2019/0131905 A1 | 5/2019 | Janakiraman et al. |
| 2019/0140454 A1* | 5/2019 | Chase .............. H02P 9/04 |
| 2019/0267805 A1 | 8/2019 | Kothuru et al. |
| 2020/0100385 A1 | 3/2020 | Held et al. |
| 2020/0270948 A1 | 8/2020 | Kothuru et al. |

FOREIGN PATENT DOCUMENTS

| | | |
|---|---|---|
| WO | 2018213925 A1 | 11/2018 |
| WO | 2019118352 A1 | 6/2019 |
| WO | 2019118477 A1 | 6/2019 |

* cited by examiner

DYNAMIC SETTINGS FOR GENSET AUTOMATIC LOAD-DEPENDENT START-STOP CONTROL

CROSS-REFERENCE TO RELATED APPLICATIONS

This application claims priority to and the benefit of U.S. Provisional Application No. 62/851,863, titled "Load Dependent Start Stop," filed May 23, 2019, the entire disclosure of which is hereby incorporated herein by reference.

BACKGROUND OF THE DISCLOSURE

An oil/gas drilling rig may utilize a number of load-sharing gensets. Each genset comprises an electrical generator driven by a diesel (or other) engine. The gensets provide electrical power to a busbar (the shared load) and/or another component of a power distribution system that, in turn, provides electrical power to various equipment on/near the rig.

The gensets generally don't operate a full power all the time. For example, the number of gensets that are operating (also referred to herein as "online") at a given time varies with the collective load demands of the rig equipment at that time. However, the more each genset operates, the greater the resulting fuel costs and eventual maintenance time and costs. On the other hand, the engines of the gensets operate more efficiently the closer such operation is to the manufacturers' load ratings. Moreover, continuously starting and stopping the gensets can cause excessive wear, resulting in increased maintenance time/costs and decreased equipment life.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method for automatic, dynamically adjusted operation of load-sharing gensets. The automatic, dynamically adjusted operation includes determining a genset-addition load. Operation of a non-operating one of the gensets automatically commences in response to actual loads of each operating genset simultaneously being at or above the genset-addition load. The automatic, dynamically adjusted operation also includes determining an initial genset-removal load, as well as determining an updated genset-removal load based on the genset-addition load, the initial genset-removal load, a human-selected one of predetermined levels of dynamism, and the number of operating ones of the gensets. The automatic, dynamically adjusted operation also includes halting operation of one of the operating gensets in response to the actual loads of each operating genset simultaneously being at or below the updated genset-removal load.

The present disclosure also introduces a load-dependent start-stop (LDSS) controller in electrical communication with load-sharing gensets and operable to dynamically adjust operation of the gensets by automatically: commencing operation of a non-operating one of the gensets in response to actual loads of each operating genset simultaneously being at or above a genset-addition load; determining an initial genset-removal load; determining an updated genset-removal load based on the genset-addition load, the initial genset-removal load, a human-selected one of predetermined levels of dynamism, and the number of operating ones of the gensets; and halting operation of one of the operating gensets in response to the actual loads of each operating genset simultaneously being at or below the updated genset-removal load.

The present disclosure also introduces a method for automatic, dynamically adjusted operation of load-sharing gensets that includes determining a genset-addition load and a genset-removal load. Operation of a non-operating one of the gensets automatically commences in response to actual loads of each operating genset simultaneously being at or above the genset-addition load. The automatic, dynamically adjusted operation of the gensets also includes, while less than two of the gensets are operating, halting operation of the operating genset based on the actual load of that genset being at or below the initial genset-removal load. The automatic, dynamically adjusted operation of the gensets also includes, while two or more of the gensets are operating, determining an updated genset-removal load based on the genset-addition load and a hysteresis setpoint, and halting operation of one of the operating gensets in response to actual loads of each operating genset simultaneously being at or below the updated genset-removal load.

The present disclosure also introduces an LDSS controller in electrical communication with load-sharing gensets and operable to dynamically adjust operation of the gensets by automatically: (A) commencing operation of a non-operating one of the gensets in response to actual loads of each operating genset simultaneously being at or above a genset-addition load; (B) determining an initial genset-removal load; (C) while less than two of the gensets are operating, halting operation of the operating genset based on the actual load of that genset being at or below the initial genset-removal load; and (D) while two or more of the gensets are operating: (1) determining an updated genset-removal load based on the genset-addition load and a hysteresis setpoint; and (2) halting operation of one of the operating gensets in response to actual loads of each operating genset simultaneously being at or below the updated genset-removal load.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
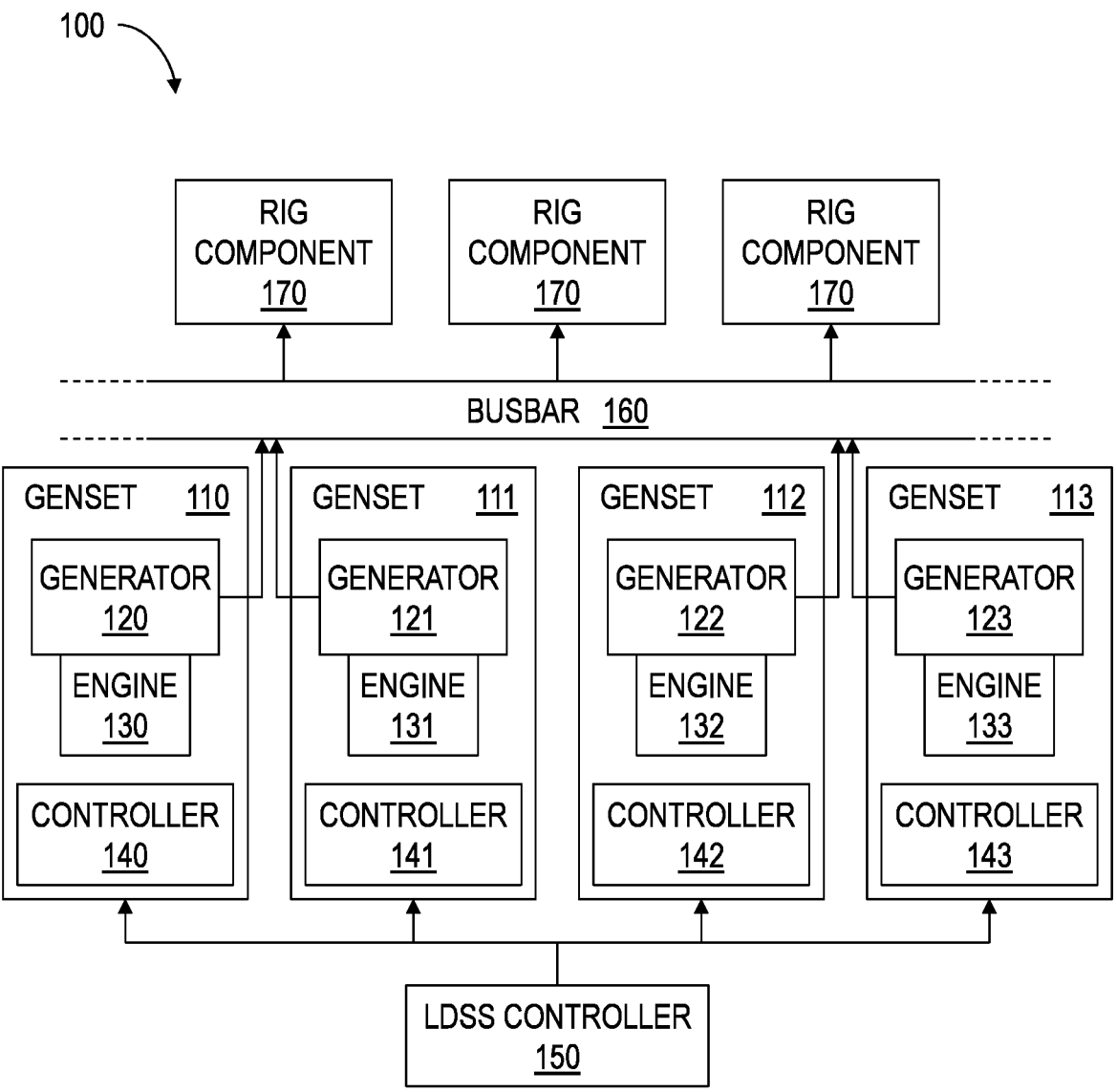
FIG. 1 is a schematic view of at least a portion of an example implementation of a power system according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity and does not in itself dictate a relationship between the various embodiments and/or configurations discussed.

FIG. 1 is a schematic view of at least a portion of an example implementation of a power system 100 according to one or more aspects of the present disclosure. The power system 100 includes four gensets 110-113, although other implementations of the power system 100 also within the scope of the present disclosure may include two, three, five, or more gensets. The gensets 110-113 may be substantially similar (or even identical), such as instances of the same model number from a given manufacturer, each having the same load ratings. However, the gensets 110-113 may also be different relative to each other, whether with respect to size, ratings, manufacturer, and/or other characteristics.

Each genset 110-113 includes a generator 120-123 driven by an engine 130-133. The engines 130-133 may be diesel engines, gasoline engines, natural gas engines, and/or others. Operation of the engines 130-133 drives the generators 120-123, which output electrical power to a busbar and/or other component of a power distribution system 160. Various drilling rig components 170 are connected to and thereby electrically powered by the power distribution system 160.

Each genset 110-113 may comprise a controller 140-143 configured to communicate signals (not shown) with the corresponding engine 130-133 and/or generator 120-123. A load-dependent start-stop (LDSS) controller 150 is connected to the controller 140-143 and/or other components of each genset 110-113 to control load sharing of the gensets 110-113 according to one or more aspects introduced by the present disclosure.

The LDSS controller 150 may control how the gensets 110-113 start, run, and stop in a manner that maintains a minimum reserve power delivered to the power distribution system 160. Consequently, reserve power sufficient to meet the demands of load swings on the power distribution system 160 regardless of loads at the generators 120-123. The actual reserve power in the system is the difference between the total rated power of the gensets 110-113 (online and offline) connected to the power distribution system 160 and the actual total power being generated by online ones of the gensets 110-113.

The LDSS controller 150 may instead (or also) control how the gensets 110-113 start, run, and stop in a manner based on the loads experienced by the online ones of the gensets 110-113. For example, if gensets 110-112 are online and each experience a load at or above a genset-addition load ($L_{GA}$), the LDSS controller 150 may automatically start the next genset 113. Similarly, if gensets 110-112 are online and each experience a load at or below a genset-removal load ($L_{GR}$), the LDSS controller 150 may halt operation of one of the gensets 110-112. The genset-addition load and the genset-removal load may each be a human-selected/input percentage of the manufacturer power ratings of the gensets 110-113. In either situation, the LDSS controller 150 may also utilize a human-selected/input dynamic parameter (DP) that aids in preventing the gensets 110-113 from being started and stopped continuously when just two, three, or four gensets are online. For example, the dynamic parameter may be selected from among a high level of dynamism, a moderate level of dynamism, and a low level of dynamism.

The LDSS controller 150 may also dynamically revise one or both of the genset-addition and genset-removal loads based on a dynamic characteristic (DC) that depends on the initial genset-addition load, the genset-removal load, and the dynamic parameter. An example for how DC may be determined is set forth below in Equation (1).

$$DC = [(L_{GA} - L_{GR}) * DP] + (L_{GR}) \quad (1)$$

A revised genset-removal load ($L_{GRR}$) may be determined based on the dynamic characteristic, such as set forth below in the example of Equation (2).

$$L_{GRR} = DC/2 \quad (2)$$

For example, considering an example where the genset-addition load is 70%, the initial genset-removal load is 30%, and just the gensets 110 and 111 are online (and have the same power ratings), Table 1 set forth below lists the dynamic characteristic values, the revised genset-removal loads, and the resulting load on genset 110 after genset 111 is stopped, for scenarios where the lower dynamic setting is 25%, the moderate dynamic setting is 50%, and the higher dynamic setting is 75%.

TABLE 1

Dynamic Influence on Stopping One of Two Gensets

| $L_{GA}$ | $L_{GR}$ | DP | DC | $L_{GRR}$ | Resulting Load (% of rating) on Genset 110 |
|---|---|---|---|---|---|
| 70% | 30% | 25% | 40% | 20% | 40% |
| 70% | 30% | 50% | 50% | 25% | 50% |
| 70% | 30% | 75% | 60% | 30% | 60% |

Continuing with this example, but with gensets 110-112 online, Table 2 set forth below lists the dynamic characteristic values, the revised genset-removal loads, the total resulting load on gensets 110 and 111 (cumulative) after genset 112 is stopped, and the individual resulting load on each of genset 110 and genset 111 after genset 112 is stopped.

TABLE 2

Dynamic Influence on Stopping One of Three Gensets

| $L_{GA}$ | $L_{GR}$ | DP | DC | $L_{GRR}$ | Total Resulting Load | Individual Resulting Load |
|---|---|---|---|---|---|---|
| 70% | 30% | 25% | 40% | 20% | 60% | 30% |
| 70% | 30% | 50% | 50% | 25% | 75% | 38% |
| 70% | 30% | 75% | 60% | 30% | 90% | 45% |

Similarly, with gensets 110-113 online, Table 3 set forth below lists the dynamic characteristic values, the revised genset-removal loads, the total resulting load on gensets 110-112 (cumulative) after genset 113 is stopped, and the individual resulting load on each genset 110-112 after genset 113 is stopped.

TABLE 3

Dynamic Influence on Stopping One of Four Gensets

| $L_{GA}$ | $L_{GR}$ | DP | DC | $L_{GRR}$ | Total Resulting Load | Individual Resulting Load |
|---|---|---|---|---|---|---|
| 70% | 30% | 25% | 40% | 20% | 80% | 27% |
| 70% | 30% | 50% | 50% | 25% | 100% | 33% |
| 70% | 30% | 75% | 60% | 30% | 120% | 40% |

It can be noticed from the resulting load on the gensets remaining online that the above determination of the load level before stopping a genset is based just on two gensets being online and does not consider whether more than two gensets are online. Consequently, the resulting load on each individual genset remaining online is far below their rated values, and thus are running inefficiently.

However, this can be rectified by taking into account the number of online gensets when revising the genset-removal load. For example, the dynamic characteristic $DC_{NOG}$ based also on the number of online gensets (NOG) may be determined according to Equation (3) set forth below.

$$DC_{NOG}=\{[(L_{GA}-L_{GR})*DP]+(L_{GR})\}*(NOG-1) \quad (3)$$

An updated genset-removal load ($L_{GRU}$) may be determined based on the NOG-based dynamic characteristic, such as set forth below in the example of Equation (4).

$$L_{GRU}=DC_{NOG}/NOG \quad (4)$$

Based on the proposed modification, the different scenarios are presented below in Table 4 for when one of two online gensets is removed, in Table 5 for when one of three gensets is removed, and in Table 6 for when one of four gensets is removed.

TABLE 4

Dynamic Influence on Stopping One of Two Gensets (NOG-Based)

| $L_{GA}$ | $L_{GR}$ | DP | $DC_{NOG}$ | $L_{GRU}$ | Resulting Load |
|---|---|---|---|---|---|
| 70% | 30% | 25% | 40% | 20% | 40% |
| 70% | 30% | 50% | 50% | 25% | 50% |
| 70% | 30% | 75% | 60% | 30% | 60% |

TABLE 5

Dynamic Influence on Stopping One of Three Gensets (NOG-Based)

| $L_{GA}$ | $L_{GR}$ | DP | $DC_{NOG}$ | $L_{GRU}$ | Total Resulting Load | Individual Resulting Load |
|---|---|---|---|---|---|---|
| 70% | 30% | 25% | 80% | 27% | 80% | 40% |
| 70% | 30% | 50% | 100% | 33% | 100% | 50% |
| 70% | 30% | 75% | 120% | 40% | 120% | 60% |

TABLE 6

Dynamic Influence on Stopping One of Four Gensets (NOG-Based)

| $L_{GA}$ | $L_{GR}$ | DP | $DC_{NOG}$ | $L_{GRU}$ | Total Resulting Load | Individual Resulting Load |
|---|---|---|---|---|---|---|
| 70% | 30% | 25% | 120% | 30% | 120% | 40% |
| 70% | 30% | 50% | 150% | 38% | 150% | 50% |
| 70% | 30% | 75% | 180% | 45% | 180% | 60% |

Figure 2:
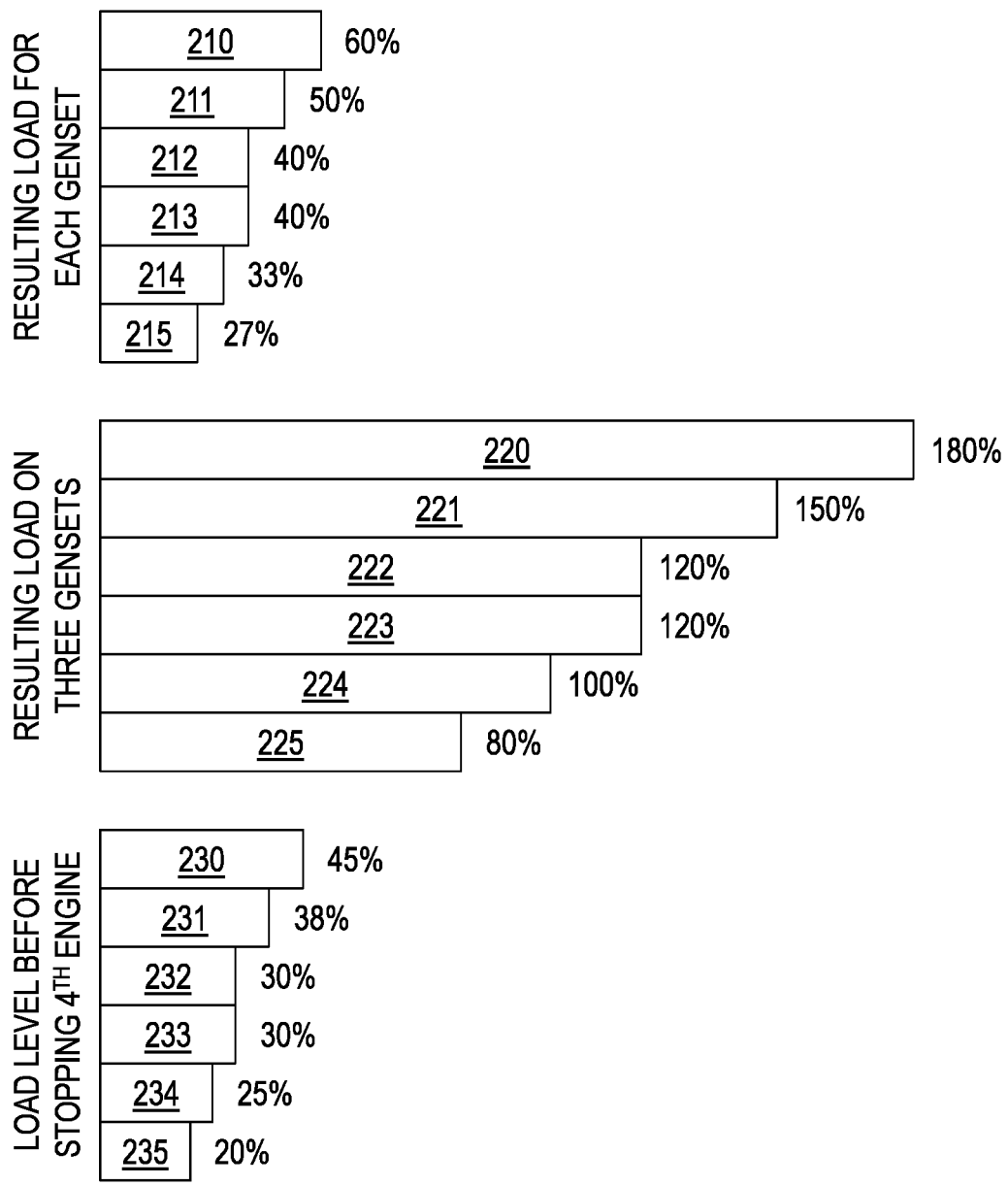
FIG. 2 contain bar graphs related to one or more aspects of the present disclosure.

It can be noticed from the above tables that the resulting load on each genset is much higher than it was before, thus permitting the gensets to run more efficiently at the current settings. FIG. 2 is a graphical view depicting the increase in operating efficiency by using $DC_{NOG}$ instead of DC when removing one of four online gensets. The resulting individual loads 210-212 at high, moderate, and low dynamic settings, respectively, are greater than the resulting individual loads 213-215 at respective high, moderate, and low dynamic settings. The resulting total loads 220-222 at respective high, moderate, and low dynamic settings are greater than the resulting total loads 223-225 at respective high, moderate, and low dynamic settings. The updated genset-removal loads ($L_{GRU}$) 230-232 at respective high, moderate, and low dynamic settings are greater than the revised genset-removal loads ($L_{GRR}$) 233-235 at respective high, moderate, and low dynamic settings.

Figure 3:
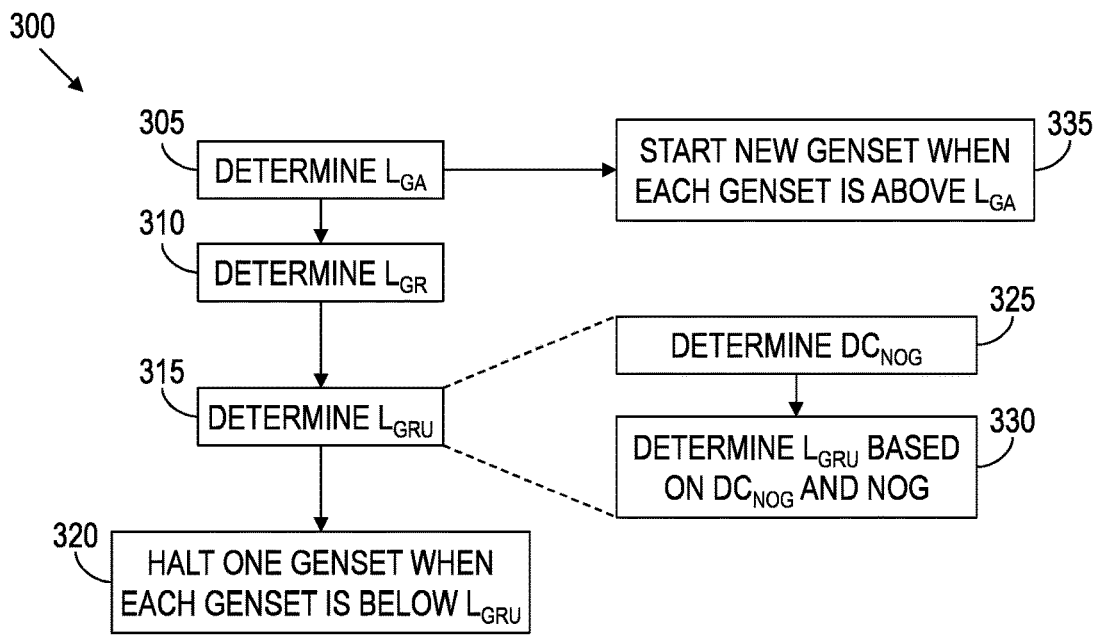
FIG. 3 is a flow-chart diagram of at least a portion of an example implementation of a method according to one or more aspects of the present disclosure.

FIG. 3 is a flow-chart diagram of at least a portion of an example implementation of a method 300 for automatic, dynamically adjusted operation of load-sharing gensets as described above. The method 300 may be caused via operation of an HMI as described above. The method 300 comprises determining 305 a genset-addition load (e.g., $L_{GA}$ above) and determining 310 an initial genset-removal load (e.g., $L_{GR}$ above). The method 300 also comprises determining 315 an updated genset-removal load (e.g., $L_{GRU}$ above) based on the genset-addition load, the initial genset-removal load, a human-selected one of a plurality of predetermined levels of dynamism (e.g., DP above), and the number of operating ones of the gensets. The method 300 also comprises halting 320 operation of one of the operating gensets in response to the actual loads of each operating genset simultaneously being at or below the updated genset-removal load.

Determining 315 the updated genset-removal load may comprise: determining 325 a dynamic characteristic (e.g., $DC_{NOG}$ above) based on the genset-addition load, the initial genset-removal load, the selected dynamism level, and the number of operating gensets; and determining 330 the updated genset-removal load based on the determined dynamic characteristic and the number of operating gensets. Determining 325 the dynamic characteristic may be via Equation (3) set forth above. Determining 330 the updated genset-removal load may be via Equation (4) set forth above. The method 300 may also comprise commencing 335 operation of a non-operating genset in response to the actual loads of each operating genset simultaneously being at or above the genset-addition load.

The present disclosure also introduces another example implementation by which the genset-removal load is dynamically limited based on the genset-addition load and a hysteresis setpoint ($HYS_{SP}$) that can be configured by the user. For example, if there are two gensets online (NOG=2), then the maximum value for genset-removal load ($L_{GR-MAX}$) may be determined via Equation (5) set forth below.

$$L_{GR-MAX}=(L_{GA}-HYS_{SP})/NOG=(L_{GA}-HYS_{SP})/2 \quad (5)$$

If there are three gensets online (NOG=3), then the maximum value for genset-removal load ($L_{GR-MAX}$) may be determined via Equation (6) set forth below.

$$L_{GR-MAX}=(L_{GA}-HYS_{SP})/[NOG/(NOG-1)] \quad (6)$$

If there is just one genset online (NOG=1), then the maximum value for genset-removal load ($L_{GR-MAX}$) may be set equal to the initially input genset-removal load ($L_{GR}$). That is, if just one genset is online, the genset-removal function of the LDSS controller 150 may be disabled (because removing that one operating genset could blackout the drilling rig) such that just the genset-additional function is operating (based on $L_{GA}$).

The above-described logic for dynamically limiting the maximum value of the genset-removal load may be represented as set forth below in Equations (7).

For NOG=1: $L_{GR\text{-}MAX} = L_{GR}$

For NOG=2: $L_{GR\text{-}MAX} = (L_{GA} - HYS_{SP})/2$

For NOG>2: $L_{GR\text{-}MAX} = (L_{GA} - HYS_{SP})/[NOG/(NOG-1)]$ (7)

This approach gives the user more freedom and flexibility in setting $L_{GR}$ to be equal to or less than $L_{GR\text{-}MAX}$ while making sure the value entered will not exceed the maximum limit that is unsafe for operation. This may also aid in ensuring the user has a full range of values to run the gensets safely and more efficiently. This can be explained in detail in Table 7 set forth below.

TABLE 7

$L_{GR\text{-}MAX}$ and Resulting Load at Various $HYS_{SP}$ and NOG

| $L_{GA}$ | $HYS_{SP}$ | $L_{GR\text{-}MAX}$ | NOG | Resulting Load |
|---|---|---|---|---|
| 70% | 5% | 33% | 2 | 65% |
| 70% | 10% | 30% | 2 | 60% |
| 70% | 5% | 43% | 3 | 65% |
| 70% | 5% | 49% | 4 | 65% |
| 70% | 5% | 52% | 5 | 65% |

Figure 4:
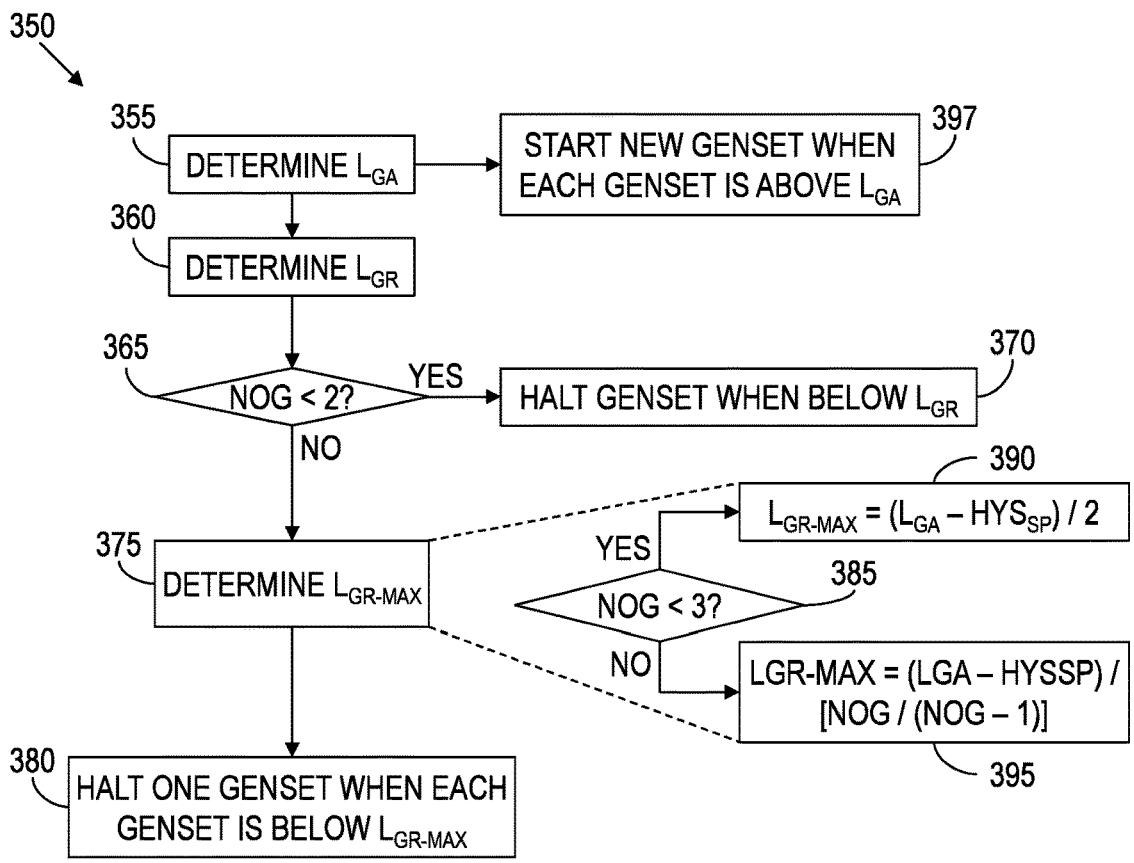
FIG. 4 is a flow-chart diagram of at least a portion of another example implementation of a method according to one or more aspects of the present disclosure.

FIG. 4 is a flow-chart diagram of at least a portion of an example implementation of a method 350 for automatic, dynamically adjusted operation of load-sharing gensets as described above. The method 350 may be caused via operation of an HMI as described above. The method 350 comprises determining 355 a genset-addition load (e.g., $L_{GA}$) and determining 360 an initial genset-removal load (e.g., $L_{GR}$). While the number of operating gensets is determined 365 to be less than two (i.e., NOG=1), operation of the operating genset is halted 370 based on the actual load of that genset being at or below the initial genset-removal load. While the number of operating gensets is determined 365 to not be less than two (i.e., NOG≥2), an updated genset-removal load (e.g., $L_{GR\text{-}MAX}$) is determined 375 based on the genset-addition load and a hysteresis setpoint, and operation of one of the operating gensets is halted 380 in response to actual loads of each operating genset simultaneously being at or below the updated genset-removal load.

Determining 375 the updated genset-removal load may depend on a determination 385 of whether less than three gensets are operating. For example, while it is determined 385 that less than three (i.e., NOG=2) gensets are operating, the updated genset-removal load may be determined 390 based on Equation (5) set forth above. However, while it is determined 385 that more than two (i.e., NOG≥3) gensets are operating, the updated genset-removal load may be determined 395 based on Equation (6) set forth above. The method 300 may also comprise commencing 397 operation of a non-operating genset in response to the actual loads of each operating genset simultaneously being at or above the genset-addition load.

Figure 5:
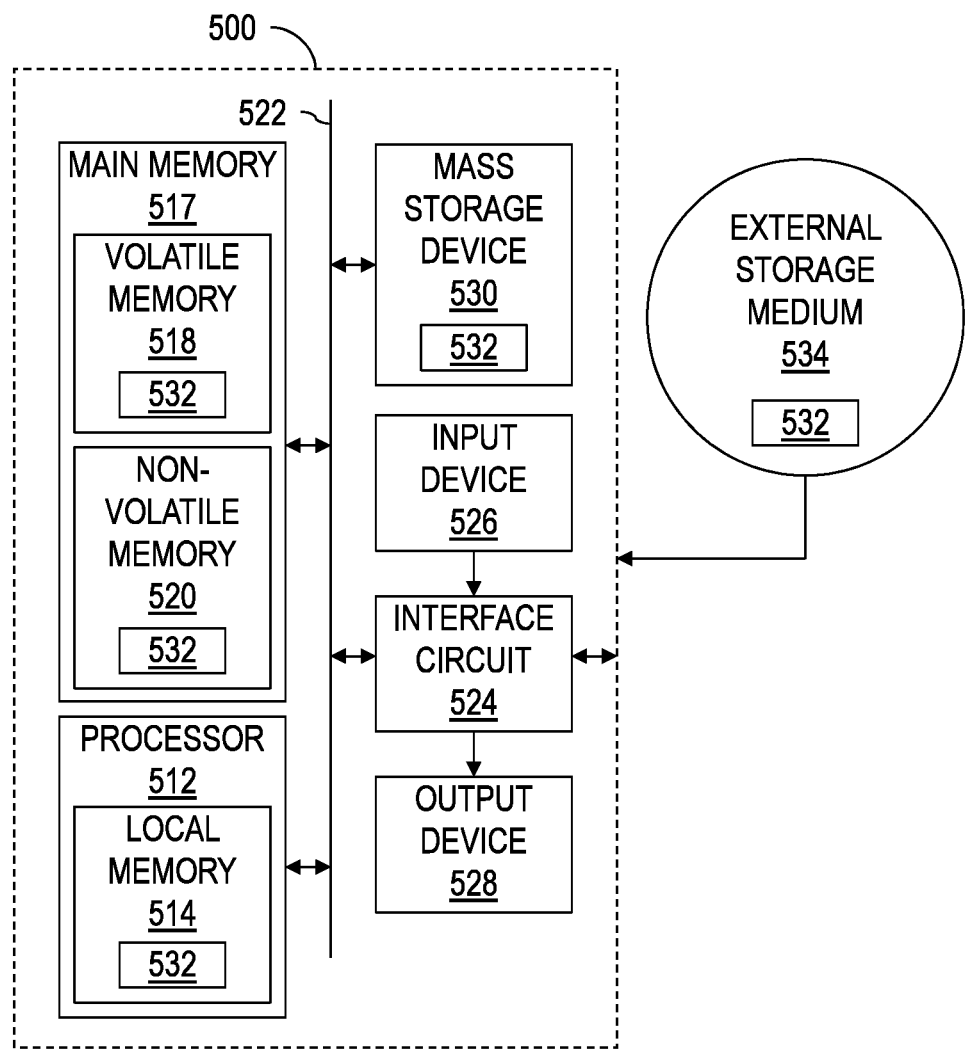
FIG. 5 is a schematic view of at least a portion of an example implementation of a processing system according to one or more aspects of the present disclosure.

FIG. 5 is a schematic view of at least a portion of an example implementation of a processing device 500 (or system) according to one or more aspects of the present disclosure. The processing device 500 may be or form at least a portion of one or more instances of one or more of the controllers 140-143 and/or the LDSS controller 150 described above. The processing device 500 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices.

The processing device 500 may comprise a processor 512, such as a general-purpose programmable processor. The processor 512 may comprise a local memory 514 and may execute machine-readable and executable program code instructions 532 (i.e., computer program code) present in the local memory 514 and/or another memory device. The processor 512 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 512 include one or more INTEL microprocessors, microcontrollers from the ARM and/or PICO families of microcontrollers, and/or embedded soft/hard processors in one or more FPGAs. The processor 512 may execute, among other things, the program code instructions 532 and/or other instructions and/or programs to implement the example methods and/or operations described herein.

The processor 512 may be in communication with a main memory 516, such as may include a volatile memory 518 and a non-volatile memory 520, perhaps via a bus 522 and/or other communication means. The volatile memory 518 may be, comprise, or be implemented by random access memory (RAM), static RAM (SRAM), dynamic RAM (DRAM), synchronous DRAM (SDRAM), RAMBUS DRAM (RDRAM), and/or other types of RAM devices. The non-volatile memory 520 may be, comprise, or be implemented by read-only memory, flash memory, and/or other types of memory devices. One or more memory controllers (not shown) may control access to the volatile memory 518 and/or non-volatile memory 520.

The processing device 500 may also comprise an interface circuit 524, which is in communication with the processor 512, such as via the bus 522. The interface circuit 524 may be, comprise, or be implemented by various types of standard interfaces, such as an Ethernet interface, a universal serial bus (USB), a third-generation input/output (3GIO) interface, a wireless interface, a cellular interface, and/or a satellite interface, among others. The interface circuit 524 may comprise a graphics driver card. The interface circuit 524 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). The interface circuit 524 can facilitate communications between the processing device 500 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a field-bus communication protocol (such as PROFIBUS, Canbus, etc.), a proprietary communication protocol, and/or another communication protocol.

One or more input devices 526 may also be connected to the interface circuit 524. The input devices 526 may permit rig personnel to enter the program code instructions 532, which may be or comprise control data, operational parameters, operational set-points, a well construction plan, and/or a database of operational sequences. The program code instructions 532 may further comprise the drilling domain applications described above, as well as other programs operable to perform example methods and/or operations described herein. The input devices 526 may be, comprise, or be implemented by a keyboard, a mouse, a joystick, a touchscreen, a track-pad, a trackball, an isopoint, and/or a voice recognition system, among other examples. One or more output devices 528 may also be connected to the interface circuit 524. The output devices 528 may permit for visualization or other sensory perception of various data, such as sensor data, status data, and/or other example data. The output devices 528 may be, comprise, or be implemented by video output devices (e.g., an LCD, an LED display, a CRT display, a touchscreen, etc.), printers, and/or speakers, among other examples. The one or more input devices 526 and the one or more output devices 528 connected to the interface circuit 524 may, at least in part, facilitate the HMIs described herein.

The processing device 500 may comprise a mass storage device 530 for storing data and program code instructions 532. The mass storage device 530 may be connected to the processor 512, such as via the bus 522. The mass storage device 530 may be or comprise a tangible, non-transitory storage medium, such as a floppy disk drive, a hard disk drive, a compact disk (CD) drive, and/or digital versatile disk (DVD) drive, among other examples. The processing device 500 may be communicatively connected with an external storage medium 534 via the interface circuit 524. The external storage medium 534 may be or comprise a removable storage medium (e.g., a CD or DVD), such as may be operable to store data and program code instructions 532.

As described above, the program code instructions 532 may be stored in the mass storage device 530, the main memory 516, the local memory 514, and/or the removable storage medium 534. Thus, the processing device 500 may be implemented in accordance with hardware (perhaps implemented in one or more chips including an integrated circuit, such as an ASIC), or may be implemented as software or firmware for execution by the processor 512. In the case of firmware or software, the implementation may be provided as a computer program product including a non-transitory, computer-readable medium or storage structure embodying computer program code instructions 532 (i.e., software or firmware) thereon for execution by the processor 512. The program code instructions 532 may include program instructions or computer program code that, when executed by the processor 512, may perform and/or cause performance of example applications, methods, processes, and/or operations described herein.

In view of the entirety of the present disclosure, including the figures and the claims, a person having ordinary skill in the art will readily recognize that the present disclosure introduces a method comprising causing automatic, dynamically adjusted operation of load-sharing gensets, wherein the automatic, dynamically adjusted operation comprises: determining a genset-addition load, wherein operation of a non-operating one of the gensets automatically commences in response to actual loads of each operating genset simultaneously being at or above the genset-addition load; determining an initial genset-removal load; determining an updated genset-removal load based on the genset-addition load, the initial genset-removal load, a human-selected one of a plurality of predetermined levels of dynamism, and the number of operating ones of the gensets; and halting operation of one of the operating gensets in response to the actual loads of each operating genset simultaneously being at or below the updated genset-removal load.

Determining the updated genset-removal load may comprise: determining a dynamic characteristic based on the genset-addition load, the initial genset-removal load, the selected dynamism level, and the number of operating gensets; and determining the updated genset-removal load based on the determined dynamic characteristic and the number of operating gensets. Determining the dynamic characteristic may be based on a product of: (A) one less than the number of operating gensets; and (B) a sum of: (1) the initial genset-removal load; and (2) a product of: (a) the selected dynamism level; and (b) a difference between the genset-addition load and the initial genset-removal load. Determining the updated genset-removal load may be based on a quotient of the determined dynamic characteristic and the number of operating gensets.

The gensets may each comprise an electrical generator driven by a corresponding engine for providing electrical power to a power distribution system.

The automatic, dynamically adjusted operation may comprise commencing operation of the non-operating genset in response to the actual loads of each operating genset simultaneously being at or above the genset-addition load.

The genset-addition load and the initial genset-removal load may be determined based on human-selected percentages of manufacturer power ratings of the gensets.

The present disclosure also introduces an apparatus comprising an LDSS controller in electrical communication with a plurality of load-sharing gensets and operable to dynamically adjust operation of the gensets by automatically: commencing operation of a non-operating one of the gensets in response to actual loads of each operating genset simultaneously being at or above a genset-addition load; determining an initial genset-removal load; determining an updated genset-removal load based on the genset-addition load, the initial genset-removal load, a human-selected one of a plurality of predetermined levels of dynamism, and the number of operating ones of the gensets; and halting operation of one of the operating gensets in response to the actual loads of each operating genset simultaneously being at or below the updated genset-removal load.

Determining the updated genset-removal load may comprise: determining a dynamic characteristic based on the genset-addition load, the initial genset-removal load, the selected dynamism level, and the number of operating gensets; and determining the updated genset-removal load based on the determined dynamic characteristic and the number of operating gensets. Determining the dynamic characteristic may be based on a product of: (A) one less than the number of operating gensets; and (B) a sum of: (1) the initial genset-removal load; and (2) a product of: (a) the selected dynamism level; and (b) a difference between the genset-addition load and the initial genset-removal load. Determining the updated genset-removal load may be based on a quotient of the determined dynamic characteristic and the number of operating gensets.

The present disclosure also introduces a method comprising causing automatic, dynamically adjusted operation of load-sharing gensets, wherein the automatic, dynamically adjusted operation comprises: (A) determining a genset-addition load, wherein operation of a non-operating one of the gensets automatically commences in response to actual loads of each operating genset simultaneously being at or above the genset-addition load; (B) determining an initial genset-removal load; (C) while less than two of the gensets are operating, halting operation of the operating genset based on the actual load of that genset being at or below the initial genset-removal load; and (D) while two or more of the gensets are operating: (1) determining an updated genset-removal load based on the genset-addition load and a hysteresis setpoint; and (2) halting operation of one of the operating gensets in response to actual loads of each operating genset simultaneously being at or below the updated genset-removal load.

Determining the updated genset-removal load may comprise: (A) while less than three of the gensets are operating, determining the updated genset-removal load based on one half of a difference between the genset-addition load and the hysteresis setpoint; and (B) while more than two of the gensets are operating, determining the updated genset-removal load based on a quotient of: (1) a difference between the genset-addition load and the hysteresis setpoint; and (2) a quotient of: (a) the number of operating gensets; and (b) one less than the number of operating gensets.

The gensets may each comprise an electrical generator driven by a corresponding engine for providing electrical power to a power distribution system.

The automatic, dynamically adjusted operation may comprise commencing operation of the non-operating genset in response to the actual loads of each operating genset simultaneously being at or above the genset-addition load.

The genset-addition load and the initial genset-removal load may be determined based on human-selected percentages of manufacturer power ratings of the gensets.

The present disclosure also introduces an apparatus comprising an LDSS controller in electrical communication with a plurality of load-sharing gensets and operable to dynamically adjust operation of the gensets by automatically: (A) commencing operation of a non-operating one of the gensets in response to actual loads of each operating genset simultaneously being at or above a genset-addition load; (B) determining an initial genset-removal load; (C) while less than two of the gensets are operating, halting operation of the operating genset based on the actual load of that genset being at or below the initial genset-removal load; and (D) while two or more of the gensets are operating: (1) determining an updated genset-removal load based on the genset-addition load and a hysteresis setpoint; and (2) halting operation of one of the operating gensets in response to actual loads of each operating genset simultaneously being at or below the updated genset-removal load.

Determining the updated genset-removal load may comprise: (A) while less than three of the gensets are operating, determining the updated genset-removal load based on one half of a difference between the genset-addition load and the hysteresis setpoint; and (B) while more than two of the gensets are operating, determining the updated genset-removal load based on a quotient of: (1) a difference between the genset-addition load and the hysteresis setpoint; and (2) a quotient of: (a) the number of operating gensets; and (b) one less than the number of operating gensets.

The gensets may each comprise an electrical generator driven by a corresponding engine for providing electrical power to a power distribution system.

The genset-addition load and the initial genset-removal load may be determined based on human-selected percentages of manufacturer power ratings of the gensets.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A method comprising:
    causing automatic, dynamically adjusted operation of load-sharing gensets, wherein the automatic, dynamically adjusted operation comprises:
        determining a genset-addition load, wherein operation of a non-operating one of the gensets automatically commences in response to actual loads of each operating genset simultaneously being at or above the genset-addition load;
        determining an initial genset-removal load;
        determining an updated genset-removal load based on the genset-addition load, the initial genset-removal load, a human-selected one of a plurality of predetermined levels of dynamism, and the number of operating ones of the gensets; and
        halting operation of one of the operating gensets in response to the actual loads of each operating genset simultaneously being at or below the updated genset-removal load.

2. The method of claim 1 wherein determining the updated genset-removal load comprises:
    determining a dynamic characteristic based on the genset-addition load, the initial genset-removal load, the selected dynamism level, and the number of operating gensets; and
    determining the updated genset-removal load based on the determined dynamic characteristic and the number of operating gensets.

3. The method of claim 2 wherein determining the dynamic characteristic is based on a product of:
    one less than the number of operating gensets; and
    a sum of:
        the initial genset-removal load; and
        a product of:
            the selected dynamism level; and
            a difference between the genset-addition load and the initial genset-removal load.

4. The method of claim 3 wherein determining the updated genset-removal load is based on a quotient of the determined dynamic characteristic and the number of operating gensets.

5. The method of claim 1 wherein the gensets each comprise an electrical generator driven by a corresponding engine for providing electrical power to a power distribution system.

6. The method of claim 1 wherein the automatic, dynamically adjusted operation comprises commencing operation of the non-operating genset in response to the actual loads of each operating genset simultaneously being at or above the genset-addition load.

7. The method of claim 1 wherein the genset-addition load and the initial genset-removal load are determined based on human-selected percentages of manufacturer power ratings of the gensets.

8. An apparatus comprising:
a load-dependent start-stop (LDSS) controller in electrical communication with a plurality of load-sharing gensets and operable to dynamically adjust operation of the gensets by automatically:
commencing operation of a non-operating one of the gensets in response to actual loads of each operating genset simultaneously being at or above a genset-addition load;
determining an initial genset-removal load;
determining an updated genset-removal load based on the genset-addition load, the initial genset-removal load, a human-selected one of a plurality of predetermined levels of dynamism, and the number of operating ones of the gensets; and
halting operation of one of the operating gensets in response to the actual loads of each operating genset simultaneously being at or below the updated genset-removal load.

9. The apparatus of claim 8 wherein determining the updated genset-removal load comprises:
determining a dynamic characteristic based on the genset-addition load, the initial genset-removal load, the selected dynamism level, and the number of operating gensets; and
determining the updated genset-removal load based on the determined dynamic characteristic and the number of operating gensets.

10. The apparatus of claim 9 wherein determining the dynamic characteristic is based on a product of:
one less than the number of operating gensets; and
a sum of:
the initial genset-removal load; and
a product of:
the selected dynamism level; and
a difference between the genset-addition load and the initial genset-removal load.

11. The apparatus of claim 10 wherein determining the updated genset-removal load is based on a quotient of the determined dynamic characteristic and the number of operating gensets.

12. A method comprising:
causing automatic, dynamically adjusted operation of load-sharing gensets, wherein the automatic, dynamically adjusted operation comprises:
determining a genset-addition load, wherein operation of a non-operating one of the gensets automatically commences in response to actual loads of each operating genset simultaneously being at or above the genset-addition load;
determining an initial genset-removal load;
while less than two of the gensets are operating, halting operation of the operating genset based on the actual load of that genset being at or below the initial genset-removal load; and
while two or more of the gensets are operating:
determining an updated genset-removal load based on the genset-addition load and a hysteresis setpoint; and
halting operation of one of the operating gensets in response to actual loads of each operating genset simultaneously being at or below the updated genset-removal load.

13. The method of claim 12 wherein determining the updated genset-removal load comprises:
while less than three of the gensets are operating, determining the updated genset-removal load based on one half of a difference between the genset-addition load and the hysteresis setpoint; and
while more than two of the gensets are operating, determining the updated genset-removal load based on a quotient of:
a difference between the genset-addition load and the hysteresis setpoint; and
a quotient of:
the number of operating gensets; and
one less than the number of operating gensets.

14. The method of claim 12 wherein the gensets each comprise an electrical generator driven by a corresponding engine for providing electrical power to a power distribution system.

15. The method of claim 12 wherein the automatic, dynamically adjusted operation comprises commencing operation of the non-operating genset in response to the actual loads of each operating genset simultaneously being at or above the genset-addition load.

16. The method of claim 12 wherein the genset-addition load and the initial genset-removal load are determined based on human-selected percentages of manufacturer power ratings of the gensets.

17. An apparatus comprising:
a load-dependent start-stop (LDSS) controller in electrical communication with a plurality of load-sharing gensets and operable to dynamically adjust operation of the gensets by automatically:
commencing operation of a non-operating one of the gensets in response to actual loads of each operating genset simultaneously being at or above a genset-addition load;
determining an initial genset-removal load;
while less than two of the gensets are operating, halting operation of the operating genset based on the actual load of that genset being at or below the initial genset-removal load; and
while two or more of the gensets are operating:
determining an updated genset-removal load based on the genset-addition load and a hysteresis setpoint; and
halting operation of one of the operating gensets in response to actual loads of each operating genset simultaneously being at or below the updated genset-removal load.

18. The apparatus of claim 17 wherein determining the updated genset-removal load comprises:
while less than three of the gensets are operating, determining the updated genset-removal load based on one half of a difference between the genset-addition load and the hysteresis setpoint; and
while more than two of the gensets are operating, determining the updated genset-removal load based on a quotient of:
a difference between the genset-addition load and the hysteresis setpoint; and
a quotient of:
the number of operating gensets; and
one less than the number of operating gensets.

19. The apparatus of claim 17 wherein the gensets each comprise an electrical generator driven by a corresponding engine for providing electrical power to a power distribution system.

20. The apparatus of claim 17 wherein the genset-addition load and the initial genset-removal load are determined based on human-selected percentages of manufacturer power ratings of the gensets.

\* \* \* \* \*